United States Patent Office 3,207,422
Patented Sept. 21, 1965

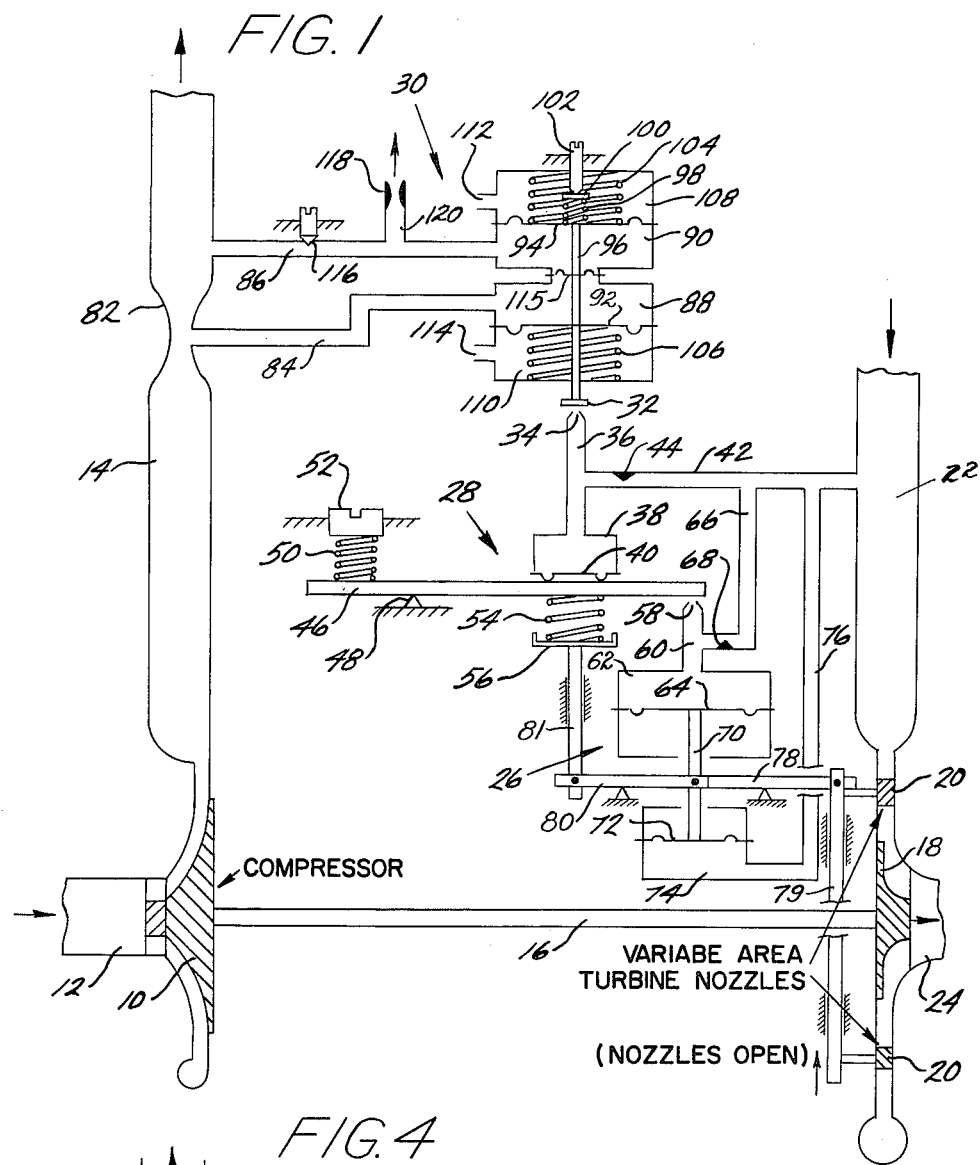
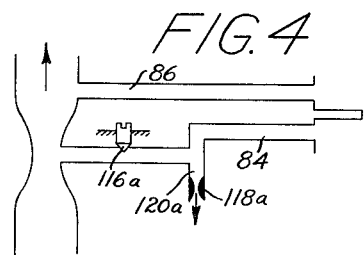

3,207,422
FLOW REGULATING MEANS IN AIRCRAFT AIR CONDITIONING AND PRESSURIZING SYSTEM
Stanley G. Best, Manchester, Conn., assignor to United Aircraft Corporation, East Hartford, Conn., a corporation of Delaware
Continuation of application Ser. No. 786,487, Jan. 13, 1959. This application Sept. 13, 1962, Ser. No. 224,274
14 Claims. (Cl. 230—10)

This application is a continuation of my copending application Serial No. 786,487 filed January 13, 1959, now abandoned and entitled Weight-Flow Regulating Means in Aircraft Air Conditioning and Pressurizing System.

This invention relates to flow control of gases and, more particularly, to means for regulating the flow of a gas through a conduit or other fluid passageway means.

While the invention is applicable to any flow control system in which it is desirable to regulate flow through a fluid passageway in terms of unit volume per unit time, it is particularly useful in aircraft air conditioning and pressurizing systems wherein pressure and/or temperature conditioned air is directed through a main supply conduit to one or more enclosures such as the aircraft cabin and other compartments. In such systems the enclosures served by the main supply conduit, whether they are temperature or pressure conditioned or both, require varying quantities of air from the supply conduit over the range of aircraft operating conditions. To insure satisfaction of the varying conditioned air requirements of the enclosures one or more valves or other flow control means is ordinarily provided in association with the enclosures. In all cases the effective operation of these valves or other flow control means and the resultant satisfaction of the conditioned air requirements of the enclosures served thereby is dependent on an adequate supply of air from the main supply conduit. Obviously, satisfaction of the requirements of the enclosures served by the main supply conduit for all anticipated conditions of aircraft operation can be provided for by continuously maintaining a high flow of conditioned air in said conduit. This results in inefficient system operation, however, the flow of conditioned air being excessive when the prevailing conditions of aircraft operation are such that the conditioned air requirements of the enclosures are comparatively low. It is particularly desirable to avoid inefficient operation of all systems and devices on modern high performance aircraft where even a small amount of wasted energy entails a significant penalty on overall aircraft performance and it is therefore a conventional practice to provide for regulation of the flow of conditioned air in the main supply conduit in accordance with a predetermined schedule which is designed to at least approximately match the flow of air through the conduit with the aggregate conditioned air requirements of the enclosures served thereby so that inadequate and excessive flows of conditioned air in the conduit will be avoided. The means for regulating flow which have heretofore been provided for this purpose have not, however, been entirely satisfactory. More specifically, the flow regulating means have generally been lacking in the flexibility required for selectively controlling flow of air in accordance with a wide variety of flow schedules found desirable for different aircraft air conditioning and pressurizing systems.

It is the general object of the present invention to provide means for regulating the flow of a gas through a conduit or other fluid passageway means, the said regulating means being characterized by a greater flexibility than that of similar means known heretofore in respect to its ability to control flow of a gas through a conduit in accordance with a variety of different predetermined schedules.

A more specific object of the invention is to provide a control device adaptable for use in a wide variety of different types of flow regulating means and which imparts the abovementioned flexibility to said means.

The drawings show two embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

FIG. 1 is a schematic illustration of a portion of an aircraft air conditioning and pressurizing system showing a preferred embodiment of the flow regulating means of the present invention;

FIG. 4 is a schematic illustration showing pressure lines and biasing means of an alternative embodiment of the invention.

Figure 2:
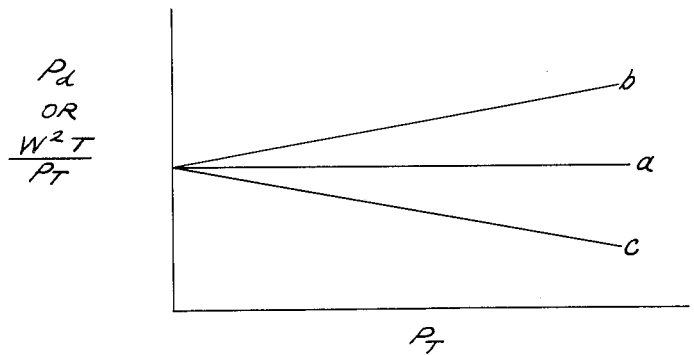
FIG. 2 is a graphical representation of several different schedules of differential pressure with total pressure obtainable with the flow regulating means of the invention; and, FIG. 3 is a graphical representation of several flow schedules corresponding to the differential pressure schedules of FIG. 2.

The portion of an aircraft air conditioning and pressurizing system shown schematically in FIG. 1 comprises an air compressor 10 which is supplied with air from a conduit 12 and which discharges the air under pressure to a conduit 14 for supply to one or more enclosures in the aircraft. The air flowing in the supply conduit 14 may or may not be temperature conditioned depending on the requirements of the enclosures served by the conduit 14, but, in any event, it is desired to exercise control over the flow of air through the said conduit.

Connected in driving relationship with the compressor 10 by a shaft 16 is an air turbine 18 of the variable area nozzle type, the reference numeral 20 designating the turbine nozzles. A conduit 22 connected with a suitable source of pressurized air such as the aircraft engine compressor supplies operating air to the turbine 18 through the nozzles 20, 20 and the spent turbine operating air is discharge through an exhaust conduit 24. The operating speed of the turbine 18 can be varied by adjusting the areas of the inlet nozzles 20, 20 and thus the operating speed of the compressor 10 and the flow of air in the conduit 14 can be varied or adjusted. For comparatively large nozzle areas, the speed of the turbine 18 and compressor 10 is relatively high and a large flow of air is provided in the conduit 14. Conversely, if the area of the nozzles 20, 20 is small, the speed of the turbine and compressor is relatively low and a smaller flow of air results in the conduit 14.

For adjusting the area of the nozzles 20, 20 there is provided actuating means comprising a pneumatic actuator indicated generally at 26. The actuator 26 operates to establish various discrete areas of the turbine nozzles 20, 20 and associated with said actuator and operable to control the actuating pressures therewithin is a pneumatic amplifier indicated generally at 28. The amplifier 28 is controlled in its operation by a control device indicated generally at 30. The actuator 26 and the amplifier 28 will be described presently and for an understanding of the same in relation to the control device 30 which will be described in detail hereinafter, it is necessary only to point out that the said control device provides an output signal to the amplifier 28 which takes the form of a motion or position of a small popped valve 32.

The poppet valve 32 is operatively associated in the amplifier 28 with a vent orifice 34 disposed at the free end of a conduit 36. The conduit 36 extends from the orifice 34 to a chamber 38 defined adjacent a diaphragm 40 and connected with said conduit between the orifice 34 and the chamber 38 is a conduit 42. The conduit 42 is supplied with high pressure servo air as by connection with the turbine supply conduit 22. The pressure differential or pressure drop across a restriction 44 in the conduit 42 is varied and controlled by the poppet valve 32. Thus, the air pressure in the conduit 36 and in the chamber 38 acting on the diaphragm 40 is varied and controlled by said poppet valve. The position of the poppet valve 32 relative to the vent orifice 34 determines the effective area of the orifice and the said pressure differential or drop as well as said conduit and chamber air pressures are obviously dependent on the orifice effective area. If, for example, the poppet valve 32 is positioned so that a relatively large effective area of the orifice 34 is provided, the pressure differential or drop across the restriction 44 is comparatively high and a low air pressure prevails in the conduit 36 and in the chamber 38 for action on the diaphragm 40. Conversely, a small effective area of the vent orifice 34, provided for by movement of the poppet valve 32 to a position somewhat closer to said orifice, results in a relatively low pressure differential or drop across the restriction 44 and a comparatively high pressure in the conduit 36 and in the chamber 38 for action on the diaphragm 40. Thus, the motion or position signal introduced to the amplifier 28 by the poppet valve 32 is converted to a proportionate pressure signal which acts on the diaphragm 40 in the amplifier chamber 38.

The diaphragm 40 is operatively associated with a pivotally supported lever 46 and, more specifically, said diaphragm engages the lever 46 and urges the same in one direction (clockwise as shown) about its pivot 48 with force proportional to the air pressure in the chamber 38. Opposing the diaphragm 40 and urging the lever 46 in the opposite or counterclockwise direction is a spring 50 disposed on the side of the pivot 48 opposite said diaphragm and provided with a manually adjustable seat 52. Also opposing the said diaphragm and urging said lever in the counterclockwise direction is a feedback spring 54. The feedback spring 54 is provided with a seat 56 which is movable with the turbine nozzle area adjusting member of the actuator 26 and the said spring is thus caused to exert a force on the lever 46 proportional to the area of the turbine nozzles 20, 20 as will be explained more fully hereinbelow.

The lever 46 of the amplifier 28 is operable to vary or control the effective area of a vent orifice 58 disposed at the free end of a conduit 60 in the actuator 26. The conduit 60 extends from the orifice 58 to an actuating chamber 62 defined adjacent a diaphragm 64. A conduit 66 connected with the conduit 60 between the vent orifice 58 and the actuating chamber 62 extends therefrom to the servo supply conduit 42 and has disposed therein a restriction 68. Thus, control of the effective area of the orifice 58 by the lever 46 results in control of the pressure in the actuating chamber 62, the explanation given above in regard to the control of pressure in the chamber 38 by the poppet valve 32 being applicable here also.

As shown, the air under controlled pressure in the actuating chamber 62 acts on the diaphragm 64 to urge the same downwardly. One end of a link 70 is connected with the diaphragm 64 for movement therewith and the other end of said link is connected with a second smaller diaphragm 72 of the actuator 26. A chamber 74 defined adjacent the smaller actuator diaphragm 72 is supplied with high pressure servo air from the conduit 42 through a connecting conduit 76 and said high pressure air acts on the diaphragm 72 to urge said diaphragm and the link 70 upwardly in opposition to the pressurized air acting on the diaphragm 64 in the actuating chamber 62. Thus, the positions of the diaphragms 64 and 72 and the link 70 connected therebetween are adjusted in unison in response to changes in the controlled pressure in the actuating chamber 62.

The link 70 constitutes the output or driving member of the actuator 26 and in the schematic illustration presented in FIG. 1 of the drawings, a connection between said link and the variable area nozzles 20, 20 is effected by means of a pivotally supported lever 78 and a vertically slidable nozzle adjusting link 79. The said connection is obviously of such nature that downward movement of the link 70, as from an increase in pressure in the actuating chamber 62, effects opening movement or an increased area of the nozzles 20, 20 and upward movement of said link, as from a decrease in pressure in the chamber 62, effects closing movement or a decreased area of said nozzles.

Connection between the link 70 and the seat 56 for the feedback spring 54 is effected by means of a pivotally supported lever 80 and a vertically slidable seat adjusting member 81. The connection is such that downward or nozzle area increasing movement of the link 70 results in upward movement of the spring seat 56 and an increase in the force exerted by the feedback spring 54 on the lever 46 in opposition to the force of the diaphragm 40. Upward or nozzle area decreasing movement of the link 70 on the other hand, results in downward movement of the seat 56 and a decrease in feedback spring force.

The combined operation of the amplifier 28 and the actuator 26 responsive to output signals of the control device 30 is suggested by the foregoing. For a known or given position of the poppet valve 32 of the control device relative to the orifice 34, a known air pressure is provided in the amplifier chamber 38. The air in the chamber 38 acts on the diaphragm 40 to exert a known force on the lever 46 tending to pivot the same in a clockwise direction. This known force is balanced by the opposing forces of the springs 50 and 54, the pressure in the actuating chamber 62 having been adjusted by movement of the lever 46 relative to the orifice 58 as required to adjust the position of the link 70 and thus the position of the spring seat 56 for the exertion of the proper balancing force on the lever 46 by the feedback spring 54. Thus, a known discrete area of the nozzles 20, 20 is established.

If the poppet valve 32 is now moved from its known or given position to a new position closer to the orifice 34, the air pressure in the amplifier chamber 38 will be increased. This will result in clockwise pivoting movement of the lever 46, in reduced effective area of the orifice 58, and in an increase in pressure in the actuating chamber 62. As the pressure increases in the actuating chamber 62, the link 70 will move downwardly to increase the area of the turbine nozzles 20, 20 and to adjust the position of the seat 56 for the feedback spring 54 upwardly. When the seat 56 has been thus moved upwardly so that the force exerted by the feedback spring 54 on the lever 46 has been increased so that the force of the diaphragm 40 on the lever 46 is balanced by the said spring force and the force of the spring 50 downward lever movement will cease. A new and larger discrete area of the turbine nozzles will have been established, the speed of rotation of the turbine 18 and the compressor 10 will have been increased, and an increased flow of air in the conduit 14 will have been established.

Movement of the poppet valve 32 away from the orifice 34 results in operation of the amplifier and actuator similar to that above described, but opposite in sense. Amplifier chamber 40 air pressure is decreased, the lever 46 moves upwardly, actuating chamber pressure decreases and turbine nozzle area is reduced until the force of the feedback spring 54 has been adjusted so that the lever forces are balanced. A new smaller discrete area of the turbine nozzles is established and turbine and compressor speed is reduced effecting a reduction in the flow of air in the conduit 14.

From the foregoing it will be apparent that the compressor 10, the turbine 18, the turbine nozzles 20, 20, the actuator 26 and the amplifier 28 together constitute means for adjusting or varying the flow of air through the conduit 14. The control device 30 cooperates with the aforesaid elements to provide flow regulating means adapted to control flow in accordance with a variety of different predetermined schedules. It is to be understood, however, that the invention is not limited to the combination of the control device with the flow adjusting a varying means shown and described above. The said control device may be utilized with any one of a variety of means for adjusting or varying the flow of a gas through a conduit. A valve adapted for movement to a plurality of discrete positions in a gas carrying conduit is but one additional exemplary means for adjusting flow with which the control device may be utilized to advantage.

In accordance with the invention, the control device 30 is operable responsive to pressures in the conduit through which flow is to be controlled. More specifically, the said device is operable responsive to a differential pressure in said conduit which is determinative of flow through the conduit. In the drawings a venturi type restriction 82 is shown in the conduit 14 and the pressure in the conduit is sensed approximately at the throat of the venturi and at a point downstream of the diffuser portion thereof. A first pressure sensing conduit 84 extending from the control device 30 communicates with the conduit 14 at the throat of the venturi 82 and a second pressure sensing conduit 86 connects the control device 30 with the conduit 14 at the aforesaid point downstream of the diffuser portion of the venturi.

The air pressure in the first sensing conduit 84 is substantially the static pressure ($P_s$) at a selected point in the conduit, i.e., the static pressure at the throat of the venturi 82. The second pressure sensing conduit 86 is also connected with the conduit 14 so as to sense a static pressure. However, the flow velocities encountered at the point of connection of said second sensing conduit with the conduit 14 are comparatively low so that the differential between the static pressure at said point and the total conduit pressure is very small. Thus, the pressure in the second sensing conduit 86 will be substantially the total conduit pressure and said pressure will be referred hereinafter by the notation $P_t$. The differential between the total conduit pressure ($P_t$) and static pressure ($P_s$) at the throat of the venturi 82 is the pressure to which the control device 30 responds and which is determinative of flow of air through the conduit 14. The notation ($P_d$) may be utilized hereinafter in referring to the said differential pressure.

A rigorous proof of the fact that the differential pressure ($P_d$) is determinative of flow for compressible fluids such as air may of course be provided but such a proof is comparatively long and complicated and is deemed unnecessary for a full understanding of the invention. The said fact is known intuitively by one skilled in the art and may be proven in a comparatively simple manner with reference to the well known Bernoulli equation for incompressible fluids. This equation holds true for compressible fluids flowing through a conduit at low velocities and may be written in proportional form as follows:

(1) $$P_d \propto DV^2$$

Where:
$P_d$=differential pressure ($P_t - P_s$)
$D$=density of the fluid
$V$=velocity of flow through conduit Proportionality between volume flow ($Q$) and velocity ($V$) is readily shown from the relationship $Q=VA$ where $A$ equals area of the conduit and may be taken as a constant. Thus:

(2) $$Q \propto V$$

Weight-flow ($W$) through a conduit equals volume flow ($Q$) multiplied by the density ($D$) of the fluid.

(3) $$W = DQ$$

Therefore:

(4) $$V \propto W/D$$

Substituting relationship (4) in relationship (1):

(5) $$P_d \propto W^2/D$$

It is well known that the density ($D$) of a gas in a conduit is proportional to the static pressure and inversely proportional to temperature of the gas. Since static and total pressures are substantially the same at the low flow velocities encountered, the following relationship may be written.

(6)

(6) $$D \propto \frac{P_t}{T}$$

Substituting relationship (6) in relationship (5).

(7) $$P_d \propto W^2 T / P_t$$

The fact that differential pressure ($P_d$) is a determining factor in weight-flow ($W$) will be apparent from inspection of mathematical relationship (7) and it will be further apparent that if control is exercised over the differential pressure ($P_d$) control of the flow ($W$) may be thereby achieved. This is illustrated graphically in FIGS. 2 and 3. As indicated by the line $a$ in FIG. 2, the differential pressure ($P_d$) may be maintained substantially constant and this will result in the expression $W^2T/P_t$ being maintained substantially constant. Assuming that the temperature ($T$) remains substantially constant in the expression $W^2T/P_t$, it will be seen that if flow ($W$) is plotted for a number of different total pressures ($P_t$) a relationship such as that indicated by the curve $a'$ in FIG. 3 will be provided. That is, for a given constant temperature of the fluid, if $P_d$ and therefore the expression $W^2T/P_t$ are maintained constant the flow ($W$) will vary with total pressure in accordance with a predetermined schedule as indicated by the curve $a'$. A family of curves similar to the curve $a'$ will of course be obtained if the flow is plotted over a range of total pressures for several different constant temperatures but these additional curves are not shown as they are unnecessary for an understanding of the invention.

Figure 3:
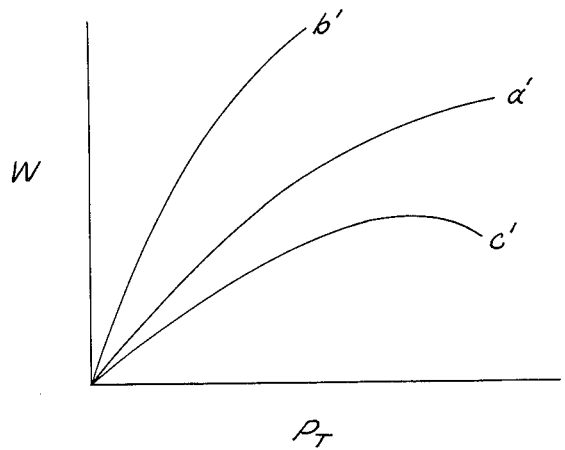

Referring again to FIG. 2, it will be seen that the differential pressure ($P_d$) and thus the expression $W^2T/P_t$ may be controlled so as to increase linearly with total pressure ($P_t$) rather than remain constant. Line $b$ in FIG. 2 represents this method of control and the line $b'$ in FIG. 3 illustrates the schedule of flow with total pressure that is obtained as a result thereof. Line $c$ in FIG. 2 illustrates linear decreasing control of $P_d$ with total pressure and line $c'$ in FIG. 3 illustrates the schedule of flow obtained as a result of such control.

As mentioned above different schedules of flow are found desirable for different aircraft air conditioning and pressurizing systems. Ordinarily these schedules are either formulated for variation of flow with total pressure in a predetermined manner or they are reducible to a schedule of flow with total pressure. Thus, the above described method of flow control wherein a differential pressure determinative of flow is controlled to provide a schedule of flow with total pressure is particularly desirable in aircraft air conditioning and pressurizing systems. The control device 30 implements this method of flow control and is readily adaptable for controlling the differential pressure ($P_d$) in accordance with each of the three lines $a$, $b$ and $c$ in FIG. 2 and in accordance with additional differential pressure control schedules. Thus, the flow schedules $a'$, $b'$ and $c'$ of FIG. 3 as well as various other schedules may be provided. Obviously, the flexibility of the control device in providing different flow schedules greatly enhances the ability of any flow regulating means including the device to meet the flow scheduling requirements of each of a wide variety of aircraft air conditioning and pressurizing systems.

The first and second pressure sensing conduits 84 and 86 associated with the control device 30 communicate respectively with first and second chambers 88 and 90 defined in said device. In the chambers 88 and 90 the air from the conduit 84 acts on movable pressure responsive means in opposition to the air from the conduit 86 so that the net air pressure force tending to move the pressure responsive means is equal to the differential pressure ($P_d$). More specifically, the air from the first conduit 84 in the chamber 88 acts on a diaphragm 92 and tends to urge the same downwardly. The air from the second conduit 86 acts in the second chamber 90 on a diaphragm 94 and tends to urge the same upwardly. Connected to the diaphragms 92 and 94 for movement therewith is a stem 96 of the poppet valve 32. The diaphragms 92 and 94 are of equal area and the net effective pressure force of the air in the chambers 88 and 90 is therefore proportional to the difference between the total and static pressures ($P_t - P_s$) in the conduit 14 or the differential pressure $P_d$. It will be seen that this net pressure force urges the diaphragms 92 and 94 and the valve stem 96 upwardly in the embodiment of the invention shown in the drawings.

Opposing the net pressure force of the air in the chambers 88 and 90 on the diaphragms 92 and 94 and the valve stem 96 is a resilient means having a known force characteristic. Said means comprises, in the embodiment of the invention shown, a small spring 98 which engages the diaphragm 94 and urges the same downwardly. The spring 98 is provided with a seat 100 which may be adjusted by means of a screw 102 to set the control point of the device. Two similar larger springs 104 and 106 are disposed respectively in chambers 108 and 110 which are located respectively above the diaphragm 94 and below the diaphragm 92. The springs 104 and 106 respectively urge the diaphragms 92 and 94 and the valve stem 96 downwardly and upwardly with substantially equal forces. Springs 104 and 106 supply a centering or nulling force proportional to the displacement of diaphragms 116 and thus provide dynamic stability of the control system during transients but the springs do not affect steady state operation. Also urging the said diaphragms and valve stem downwardly is air at atmospheric pressure in the chamber 108 supplied through a conduit 112. Air, also at atmospheric pressure, is supplied to the chamber 110 through a conduit 114 and acts on the diaphragm 92 to urge the same and the diaphragm 94 and valve stem 96 upwardly. Another force acting on the diaphragms 92 and 94 and the valve stem 96 is an air pressure derived force exerted by a small sealing diaphragm 115. The said diaphragm prevents communication between the chambers 88 and 90 and has a comparatively small area so that the forces exerted thereby on the valve stem 96 are not significant to the operation of the control device.

It will be apparent from the foregoing that the control device 30 as thus far described will operate with the flow adjusting means comprising the amplifier 28, the actuator 26, the turbine 20, and the compressor 10 to maintain a substantially constant differential pressure ($P_d$) in the conduit 14 and will therefore provide the flow schedule represented by the curve $a'$ in FIG. 3. An increase in the differential pressure ($P_d$) above the control point of the device as determined by the setting of the spring 98 will result in upward movement of the diaphragms 92 and 94 and the valve stem 96. Movement of the poppet valve 32 away from the amplifier orifice 34 will result in increased effective area of said orifice and this will cause the amplifier 28 and the actuator 26 to operate to decrease the area of the turbine nozzles 20, in the manner described above. This will result in reduced turbine and compressor speed and the flow of air through the conduit 14 will be decreased until the differential pressure ($P_d$) returns to the desired constant level and the control device 30 and flow adjusting means come to rest. If, on the other hand, the differential pressure ($P_d$) decreases below the desired constant level the poppet valve 32 will move upwardly to increase the effective area of the amplifier orifice 34 and the amplifier and actuator will operate to cause increased turbine and compressor speed and increased flow of air through the conduit 14. When the differential pressure ($P_d$) increases to the desired constant level, flow adjusting operation of the control device 30, the amplifier 28, the actuator 26, the turbine 18, and the compressor 10 will cease.

As mentioned the control device 30 is readily adaptable for controlling differential pressure and thus flow in a conduit in accordance with a wide variety of predetermined schedules. In adapting the device to vary differential pressure over a range of total pressures instead of maintaining the said pressure constant, biasing means is incorporated in the device. The said biasing means may take different forms within the scope of the invention, but is adapted in all cases to introduce a biasing force in the device which varies with total pressure or with another reference pressure which is utilized in scheduling differential pressures. In the embodiment of the invention shown in FIG. 1 the biasing means comprises an adjustable restriction 116 in the second pressure sensing conduit 86 and a restriction 118 in a vent conduit 120 extending from the said conduit 86. The restriction 118 shown takes the form of a small venturi and the form and size thereof is such that sonic flow will occur continuously therethrough, or, stated differently, said restriction form and size is such that choked conditions will prevail thereat for all total pressures encountered in the conduit 14. Thus, the pressure drop across the restriction 116 will be directly proportional to the pressure in the conduit 86 upstream thereof or, in other words, said pressure drop will be proportional to the total pressure. The pressure felt by the diaphragm 94 in the control device 30 is the total pressure less the drop across the restriction 116 and the said pressure drop increases as total pressure increases. Thus, the control device 30, in operating to maintain the differential pressure which is felt therewithin at a constant level, will increase the differential pressure ($P_d$) in the conduit 14 with increasing total pressure as indicated by the line $b$ in FIG. 2.

It will be seen that the effect of the restrictions 116 and 118 and the vent conduit 120 is to introduce indirectly to the diaphragms 92 and 94 and the valve stem 96 a downwardly acting biasing force which increases in direct proportion to the increase in total pressure. Obviously a similar result may be otherwise obtained as by directly biasing the said elements and it is within the scope of the invention to bias the control device with means other than those shown.

If in a particular air conditioning and pressurizing system a flow schedule of the type represented by curve $c'$ in FIG. 3 is desired, the control device 30 may be readily adapted to provide the pressure schedule of line $c$ in FIG. 2 whereby to provide the desired flow schedule. This may be accomplished by biasing the static pressure felt by the control device 30 in the same manner as total pressure is biased above. In FIG. 4 appropriate biasing means are shown and comprise an adjustable restriction 116a in the first or static pressure sensing conduit 84 and a vent conduit 120a having a venturi restriction 118a therein. As in the case of the conduit 84 in the FIG. 1 embodiment of the invention, the second or total pressure sensing conduit 86 is not altered or provided with biasing means in this alternative embodiment of the invention.

From the foregoing, it will be apparent that the venturi restriction 118a may be maintained in a choked condition to provide for pressure conditions wherein the pressure drop across the restriction 116a will vary in direct proportion to the static pressure. Thus, the control device 30, in operating to maintain the differential pressure felt therewithin at a constant level, will decrease the differential pressure ($P_d$) in the conduit 14 with increasing static and total pressures and will provide the desired line c schedule. Similarly, but providing various other biasing means other desired pressure and flow schedules may be obtained and the provision of such other biasing means is within the scope of the invention.

From the foregoing it will be apparent that a control device has been provided which may be utilized with a wide variety of flow adjusting means to form a means for regulating the flow of a gas in a conduit or other fluid passageway. The said control device is of simple construction and is highly dependable in its operation. In addition, a high degree of flexibility is exhibited by the device in respect to the manner in which it controls an associated flow adjusting means and as a result there is provided a highly flexible and efficient flow regulating means which can operate to provide a wide variety of different flow schedules.

The invention claimed is:

1. Means for regulating the flow of a gas through a conduit comprising in combination, means for adjusting the flow of gas through the conduit, means defining a first pressure sensing passageway connected with the conduit in such manner that gas is supplied thereto at a first pressure, means defining a second pressure sensing passageway connected with the conduit in such manner that gas is supplied thereto at a second pressure which differs from said first pressure but which is related to said first pressure in such a way that the differential between said two pressures is determinative of flow through the conduit, and a control device connected with said first and second passageways and including first and second chambers and first and second spring biased diaphragms connected with a movable means operable responsive to the differential between said first and second pressures to control said flow adjusting means so that flow through said conduit is varied as required to maintain the differential pressure felt by said movable means substantially constant, said control device also including biasing means.

2. Means for regulating the flow of a gas through a conduit comprising in combination, means for adjusting the flow of gas through the conduit, means defining a first pressure sensing passageway connected with the conduit in such manner that gas is supplied thereto at a first pressure, means defining a second pressure sensing passageway connected with the conduit in such manner that gas is supplied thereto at a second pressure which differs from said first pressure but which is related to said first pressure in such a way that the differential between said two pressures is determinative of flow through the conduit, and a control device connected with said first and second passageways and including first and second chambers and first and second spring biased diaphragms connected with a movable means operable responsive to the differential between said first and second pressures to control said flow adjusting means so that flow through said conduit is varied as required to maintain the differential pressure felt by said movable means substantially constant, said control device also including biasing means adapted to modify the differential pressure felt by said movable means and thereby to modify the operation of said means, said biasing means comprising a restriction in one of said pressure sensing passageways and a restricted vent conduit connected with said one pasageway.

3. Means for regulating the flow of a gas through a conduit comprising in combination, means for adjusting the flow of gas through the conduit, means defining a first pressure sensing passageway connected with the conduit in such manner that gas is supplied thereto at a first pressure, means defining a second pressure sensing passageway connected with the conduit in such manner that gas is supplied thereto at a second pressure which differs from said first pressure but which is related to said first pressure in such a way that the differential between said two pressures is determinative of flow through the conduit, and a control device connected with said first and second passageways and including first and second chambers and first and second spring biased diaphragms connected with a movable means operable responsive to the differential between said first and second pressures to control said flow adjusting means so that flow through said conduit is varied as required to maintain the differential pressure felt by said movable means substantially constant, said control device also including biasing means adapted to modify the differential pressure felt by said movable means and thereby to modify the operation of said means, said biasing means comprising an adjustable restriction in one of said pressure sensing passageways and a restricted vent conduit connected with said one passageway, the restriction in said vent conduit being so formed and sized that choked conditions prevail thereat for at least some of the pressures encountered in said one pressure sensing passageway.

4. Means for regulating the flow of a gas through a conduit comprising in combination, means for adjusting the flow of gas through the conduit, means defining a first pressure sensing passageway connected with the conduit in such manner that gas is supplied thereto at a first pressure, means defining a second pressure sensing passageway connected with the conduit in such manner that gas is supplied thereto at a second pressure which differs from said first pressure but which is related to said first pressure in such a way that the differential between said two pressures is determinative of flow through the conduit, and a control device connected with said first and second passageways and including first and second chambers and first and second spring biased diaphragms connected with a movable means operable responsive to the differential between said first and second pressures to control said flow adjusting means so that flow through said conduit is varied as required to maintain the differential pressure felt by said movable means substantially constant, said control device also including biasing means adapted to modify the differential pressure felt by said movable means and thereby to modify the operation of said means, said biasing means comprising an adjustable restriction in one of said pressure sensing passageways and a restricted vent conduit connected with said one passageway, the restriction in said vent conduit being formed in such a way that choked conditions prevail thereat for all of the pressures encountered in said one pressure sensing passageway.

5. Means for regulating the flow of gas through a conduit comprising in combination, means for adjusting the flow of gas through the conduit, means defining a first pressure sensing passageway connected with the conduit in such manner that gas is supplied thereto at a first pressure, means defining a second pressure sensing passageway connected with the conduit in such manner that gas is supplied thereto at a second pressure which differs from said first pressure but which is related to said first pressure in such a way that the differential between said two pressures is determinative of flow through the conduit, and a control device connected with said first and second passageways and including first and second chambers and first and second spring biased diaphragms connected with a movable means operable responsive to the differential between said first and second pressures to control said flow adjusting means so that flow through said conduit is varied as required to maintain the differential pressure felt by said movable means substantially constant, said control device also including biasing means adapted to modify the differential pressure felt by said movable means and thereby to modify the operation of said means, said biasing means comprising an adjustable restriction in one of said pressure sensing passageways and a restricted vent conduit connected with said one passageway, the restriction in said vent conduit taking the form of a small venturi suitably sized so that choked conditions prevail thereat for all of the pressures encountered in said one pressure sensing passageway.

6. Means for regulating the flow of a gas through a conduit comprising in combination, means for adjusting the flow of gas through the conduit, means defining a first pressure sensing passageway connected with the conduit in such manner that gas is supplied thereto at substantially the static pressure at a selected point in the conduit, means defining a second pressure sensing passageway connected with the conduit in such manner that gas is supplied thereto at substantially the total conduit pressure, and a control device connected with said first and second passageways and including first and second chambers and first and second spring biased diaphragms connected with a movable means operable responsive to the differential between said static and total pressures to control said flow adjusting means so that flow through said conduit is varied as required to maintain the differential pressure felt by said movable means substantially constant, said control device also including biasing means adapted to modify the differential pressure felt by said movable means and thereby to modify the operation of said means and the flow adjusting means controlled thereby, said biasing means comprising a restriction in the total conduit pressure sensing passageway and a restricted vent conduit connected with said passageway, the restriction in said vent conduit taking the form of a small venturi suitably sized so that choked conditions prevail thereat for all total conduit pressures encountered.

7. Means for regulating the flow of a gas through a conduit comprising in combination, means for adjusting the flow of gas through the conduit, means defining a first pressure sensing passageway connected with the conduit in such manner that gas is supplied thereto at substantially the static pressure at a selected point in the conduit, means defining a second pressure sensing passageway connected with the conduit in such manner that gas is supplied thereto at substantially the total conduit pressure, and a control device connected with said first and second passageways and including diaphragm means adapted to be urged in one direction by the differential between said static and total pressure and in an opposite direction by resilient force means and also including an output signal member connected for movement with said diaphragm means and adapted to control said flow adjusting means so that flow through said conduit is varied as required to maintain the differential pressure felt by said diaphragm means substantially constant, said control device also including biasing means adapted to modify the differential pressure felt by said diaphragm means and thereby to modify the operation of said flow adjusting means, said biasing means comprising a restriction in the total conduit pressure sensing passageway and a restricted vent conduit connected with said passageway, the restriction in said vent conduit taking the form of a small venturi suitably sized so that choked conditions prevail thereat for all total conduit pressures encountered.

8. Means adapted to regulate the flow of a gas through a conduit having a venturi type restriction therein and comprising in combination, means for adjusting the flow of gas through the conduit, means defining a first pressure sensing passageway connected with the conduit in such manner that gas is supplied thereto at substantially the static pressure at the throat of the venturi therein, means defining a second pressure sensing passageway connected with the conduit at a point spaced from the venturi in such manner that gas is supplied thereto at substantially the total conduit pressure, and a control device connected with said first and second passageways and including diaphragm means adapted to be urged in one direction by the differential between the pressures in said first and second pressure sensing passageways and in an opposite direction by resilient force means and also including an output signal member connected for movement with said diaphragm means and adapted to control said flow adjusting means so that flow through said conduit is varied as required to maintain the differential pressure felt by said diaphragm means substantially constant, said control device also including biasing means adapted to modify the differential pressure felt by said diaphragm means and to thereby modify the operation of said flow adjusting means, said biasing means comprising a restriction in the total conduit pressure sensing passageway and a restricted vent conduit connected with said passageway, the restriction in said vent conduit taking the form of a small venturi suitably sized so that choked conditions prevail thereat for all total pressures encountered.

9. The combination of a first pressure sensing passageway connected with a gas carrying conduit to receive gas at a first pressure, a second pressure sensing passageway connected with the conduit to receive gas at a second pressure, a differential pressure sensitive control device connected with said first and second passageways and including first and second chambers and first and second spring biased diaphragms connected with a means movable in proportion to the differential between said first and second pressures, and a biasing means adapted to modify the differential pressure felt by said control device and comprising a restriction in one of said pressure sensing passageways and a restricted vent conduit connected with said one passageway.

10. The combination of a first pressure sensing passageway connected with a gas carrying conduit to receive gas at a first pressure, a second pressure sensing passageway connected with the conduit to receive gas at a second pressure, a differential pressure sensitive control device connected with said first and second passageways and including first and second chambers and first and second spring biased diaphragms connected with a means movable in proportion to the differential between said first and second pressures, and a biasing means adapted to modify the differential pressure felt by said control device and comprising a restriction in one of said pressure sensing passageways and a restricted vent conduit connected with said one passageway, the restriction in said vent conduit being so formed and sized that choked conditions prevail thereat for at least some of the pressures encountered in said one pressure sensing passageway.

11. The combination of a first pressure sensing passageway connected with a gas carrying conduit to receive gas at a first pressure, a second pressure sensing passageway connected with the conduit to receive gas at a second pressure, a differential pressure sensitive control device connected with said first and second passageways and including first and second chambers and first and second spring biasd diaphragms connected with a means movable in proportion to the differential between said first and second pressures, and a biasing means adapted to modify the differential pressure felt by said control device and comprising a restriction in one of said pressure sensing passageways and a restricted vent conduit connected with said one passageway, the restriction in said vent conduit being formed in such a way that choked conditions prevail thereat for all of the pressures encountered in said one pressure sensing passageway.

12. The combination of a first pressure sensing passageway connected with a gas carrying conduit to receive gas at a first pressure, a second pressure sensing passageway connected with the conduit to receive gas at a second pressure, a differential pressure sensitive control device connected with said first and second passageways and including first and second chambers and first and second spring biased diaphragms connected with a means movable in proportion to the differential between said first and second pressures, and a biasing means adapted to modify the differential pressure felt by said control device and comprising a restriction in one of said pressure sensing passageways and a restricted vent conduit connected with said one passageway, the restriction in said vent conduit taking the form of a small venturi suitably sized so that choked conditions prevail thereat for all of the pressures encountered in said one pressure sensing passageway.

13. The combination of a first pressure sensing passageway connected with a gas carrying conduit so as to receive gas at substantially the static pressure at a selected point in the conduit, a second pressure sensing passageway connected with the conduit so as to receive gas at substantially the total conduit pressure, a differential pressure sensitive control device connected with said first and second passageways and including first and second chambers and first and second spring biased diaphragms connected with a means movable in proportion to the differential between said static and total conduit pressures, and a biasing means adapted to modify the differential pressure felt by said control device and comprising a restriction in said second pressure sensing passageway and a restricted vent conduit connected with said second passageway, the restriction in said vent conduit taking the form of a small venturi suitably sized so that choked conditions prevail thereat for all total conduit pressures encountered.

14. The combination of a first pressure sensing passageway connected with a gas carrying conduit so as to receive gas at substantially the static pressure at a selected point in the conduit, a second pressure sensing passageway connected with the conduit so as to receive gas at substantially the total conduit pressure, a differential pressure sensitive control device connected with said first and second passageways and including first and second chambers and first and second spring biased diaphragms connected with a means movable in proportion to the differential between said static and total conduit pressures, and a biasing means adapted to modify the differential pressure felt by said control device and comprising a restriction in said first pressure sensing passageway and a restricted vent conduit connected with said first passageway, the restriction in said vent conduit taking the form of a small venturi suitably sized so that choked conditions prevail thereat for all static conduit pressures encountered.

References Cited by the Examiner
UNITED STATES PATENTS

| | | | |
|---|---|---|---|
| 1,198,162 | 9/16 | Smoot | 230—10 |
| 1,655,683 | 1/28 | Standerwick | 230—10 |
| 1,784,009 | 12/30 | Huff | 230—5 |
| 1,874,136 | 8/32 | Standerwick | 230—5 |
| 2,813,672 | 11/57 | Long | 230—114 |
| 2,871,671 | 2/59 | Bartlett | 230—10 |
| 2,886,968 | 5/59 | Johnson | 230—114 |
| 3,073,511 | 1/63 | Knight | 230—115 |
| 3,080,712 | 3/63 | Wood. | |

LAURENCE V. EFNER, *Primary Examiner.*